(12) United States Patent
Hernandez et al.

(10) Patent No.: US 9,720,592 B2
(45) Date of Patent: *Aug. 1, 2017

(54) MOBILE GESTURE REPORTING AND REPLAY WITH UNRESPONSIVE GESTURES IDENTIFICATION AND ANALYSIS

(71) Applicant: International Business Machines Corporation, Armonk, NY (US)

(72) Inventors: Omar Hernandez, Oakley, CA (US); Vikas Madan, San Mateo, CA (US); Sophia A. Simpson, San Francisco, CA (US); Sukhbir Singh, Hayward, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,688

(22) Filed: Mar. 19, 2015

(65) Prior Publication Data
US 2016/0274786 A1    Sep. 22, 2016

(51) Int. Cl.
  *G06F 3/0488*  (2013.01)
  *G06F 3/01*    (2006.01)
  *G06F 9/44*    (2006.01)

(52) U.S. Cl.
  CPC .......... *G06F 3/04883* (2013.01); *G06F 3/017* (2013.01); *G06F 9/44* (2013.01)

(58) Field of Classification Search
  CPC .. G06F 3/0416; G06F 3/0488; G06F 3/04883; G06F 3/0482; G06F 3/017; H04N 21/42224
  See application file for complete search history.

(56) References Cited

U.S. PATENT DOCUMENTS 8,954,894 B2 * 2/2015 Lorenz ................ G06F 3/0486
                                         345/179
9,354,811 B2 * 5/2016 Chaudhri ............ G06F 3/04817
(Continued)

OTHER PUBLICATIONS

Grace Period Disclosure: "IBM Tealeaf Customer Experience V9.0.1 supports SoftLayer and Azure cloud deployment, and delivers new features and enhancements to Tealeaf CX Mobile and Tealeaf cxOverstat", IBM Asia Pacific Software Announcement, AP14-0529, dated Dec. 2, 2014.
(Continued)

*Primary Examiner* — Abbas Abdulselam
(74) *Attorney, Agent, or Firm* — North Shore Patents, P.C.; Michele Liu Baillie

(57) ABSTRACT

In gesture reporting and replay, touch events are captured from an operating system of a client device for touch actions on a touchscreen. The touch events are interpreted as gestures. Any application events are captured from an application in response to the gestures. A given gesture and any given application event in response to the given gesture are compared against an expected application event. When there is a match, the given gesture is identified as a responsive gesture. When there is no match, the given gesture is identified as a non-responsive gesture. The gesture information for the given gesture, any application event in response to the given gesture, and a screen layout displayed on the touchscreen at the time of the given gesture are sent to a service. For the information received, the service replays the given gesture and generates a report.

19 Claims, 8 Drawing Sheets

(56) References Cited

U.S. PATENT DOCUMENTS

| | | | |
|---|---|---|---|
| 2011/0050588 A1* | 3/2011 | Li | G06F 3/0414 345/173 |
| 2011/0163971 A1 | 7/2011 | Wagner et al. | |
| 2013/0263042 A1* | 10/2013 | Buening | G06F 3/0488 715/783 |
| 2014/0137052 A1 | 5/2014 | Hernandez et al. | |
| 2014/0282270 A1 | 9/2014 | Slonneger | |
| 2016/0006791 A1* | 1/2016 | Ladiwala | H04W 4/023 709/219 |

OTHER PUBLICATIONS

"Detecting Multitasking Gestures", Streaming Colour, http://www.streamingcolour.com/blog/2012/07/26/detecting-multitasking-gestures/, Jul. 2012, retrieved Mar. 11, 2015.

"Event Handling Guide for iOS", Apple Inc., Feb. 2015.

"Gesture recognition", Wikipedia, http://en.wikipedia.org/wiki/Gesture_recognition, retrieved Mar. 11, 2015.

"Gesture-Based Method for User Identification to Advanced Television Viewing Platforms", IP.com, No. 000206947, May 2011.

"Initialization of a Multi Touchscreen Device via Gesture", IP.com, No. 000212632, Nov. 2011.

"Tracking and analyzing unresponsive gestures in ios", Stack Overflow, http://stackoverflow.com/questions/24143542/tracking-and-analyzing-unresponsive-gestures-in-ios, retrieved Mar. 11, 2015.

"UPDD—Gesture and Inking", Touch-base.com, http://touch-base.com/documentation/gestures.htm, Jan. 2015, retrieved Mar. 11, 2015.

Smus, Boris, "Multi-touch Web Development", http://www.html5rocks.com/en/mobile/touch/, Aug. 2011, retrieved Mar. 11, 2015.

Wang, Jun-Zhe et al., "VirtualTouch: A Finger Glove to Simulate Touch Screen Commands", sensors, 2012 IEEE, Oct. 2012.

List of IBM Patents or Applications Treated as Related.

* cited by examiner

Double Tap

Zoom

Single Tap

Swipe

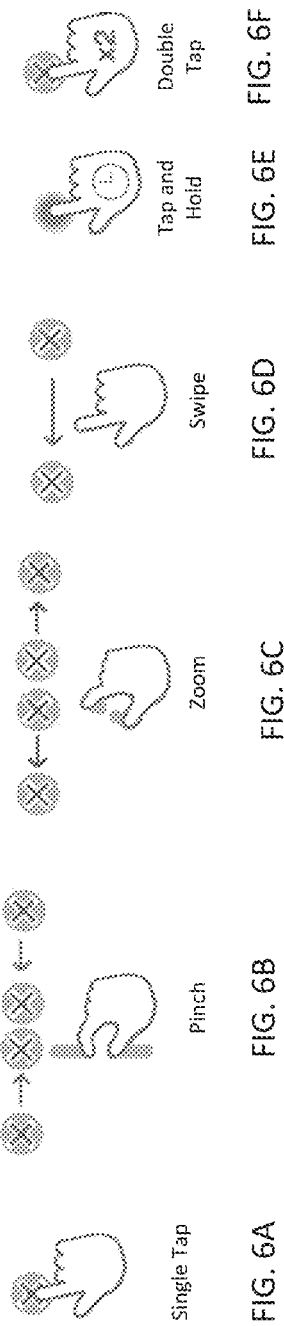

MOBILE GESTURE REPORTING AND REPLAY WITH UNRESPONSIVE GESTURES IDENTIFICATION AND ANALYSIS

STATEMENT REGARDING PRIOR DISCLOSURES BY THE INVENTOR OR A JOINT INVENTOR

The following disclosure(s) are submitted under 35 U.S.C. 102(b)(1)(A):
"IBM Tealeaf Customer Experience V9.0.1 supports Soft-Layer and Azure cloud deployment, and delivers new features and enhancements to Tealeaf CX Mobile and Tealeaf cxOverstat", IBM Asia Pacific Software Announcement, AP14-0529, dated Dec. 2, 2014.

BACKGROUND

In developing applications for touch-enabled devices, understanding the human interaction with the device's touchscreen is required to identify bugs, graphic design issues, and complexities which arise between a time when a human touches the touchscreen and a time when an application embedded on the touch device responds. However, it is difficult for application developers to gain insight into what the user is trying to do, especially if the application isn't responding in the way that the user thought it should respond. For example, if a graphic designer wants to improve the user experience of a restaurant application, the size of different buttons throughout the application might be changed to accommodate easy navigation. The graphic designer does not have a tool to identify if the customer is going through any struggles due to the change in the size of the buttons or the layout on the screen. Similarly, if a designer puts a logo in the screen layout that is not coded to be a button and the user taps on the logo, the application will not respond. The designer would not know that the user tapped on the logo. In both cases, the user is frustrated and confused about how to navigate. The application developer does not know that the user was confused or frustrated, simply that they most likely abandoned the application. Current solutions are able to capture events about previously coded or anticipated user actions (such as clicking on a button). These solutions however are unable to provide insight into what the user was attempting to accomplish but was unable to ultimately achieve.

SUMMARY

According to one embodiment of the present invention, one or more touch events are captured from an operating system of a client device for touch actions on a touchscreen coupled to the client device in a method for gesture reporting. The one or more touch events are interpreted as one or more gestures. A given gesture of the one or more gestures and any given application event in response to the gesture are compared against an expected application event. If the gesture and any application event match the one or more expected application events, then the gesture is identified as a responsive gesture. If the gesture and any application event do not match the one or more expected application events, then the gesture is identified as a non-responsive gesture. The gesture information, any responding application event, and the screen layout display on the touchscreen at the time of the given gesture are sent to a service. The service replays the gesture using the gesture information, any responding application event, and the screen layout. Additionally the service generates a report using the gesture information for said gesture, any responding application events, and the screen layout displayed on the touchscreen at the time of the given gesture.

System and computer program products corresponding to the above-summarized methods are also described and claimed herein.

BRIEF DESCRIPTION OF THE DRAWINGS

FIGS. 6A-6F illustrate example graphics that may be used by the replay engine in replaying unresponsive gestures according to embodiments of the present invention.

DETAILED DESCRIPTION

Embodiments of the present invention provide gesture reporting and replay. Data concerning human interactions with an application via a touchscreen is captured. The embodiments capture information on gestures, application responses to the gestures, and the screen layout. This information is then used to replay the human interactions with the application. A gesture to which an application fails to respond as expected from a user's perspective is referred to herein as a "non-responsive gesture". Non-responsive gestures may also be identified by comparing the gestures and application responses with expected application responses. Information about the non-responsive gestures may then be included in a report. The reports and replays not only allow application developers to understand what actions the user made in interacting with the screen layout, but for the non-responsive gestures, they also allow the application developers to gain insight on what operation user was trying to execute, but which was not successfully interpreted by the application.

Figure 1:
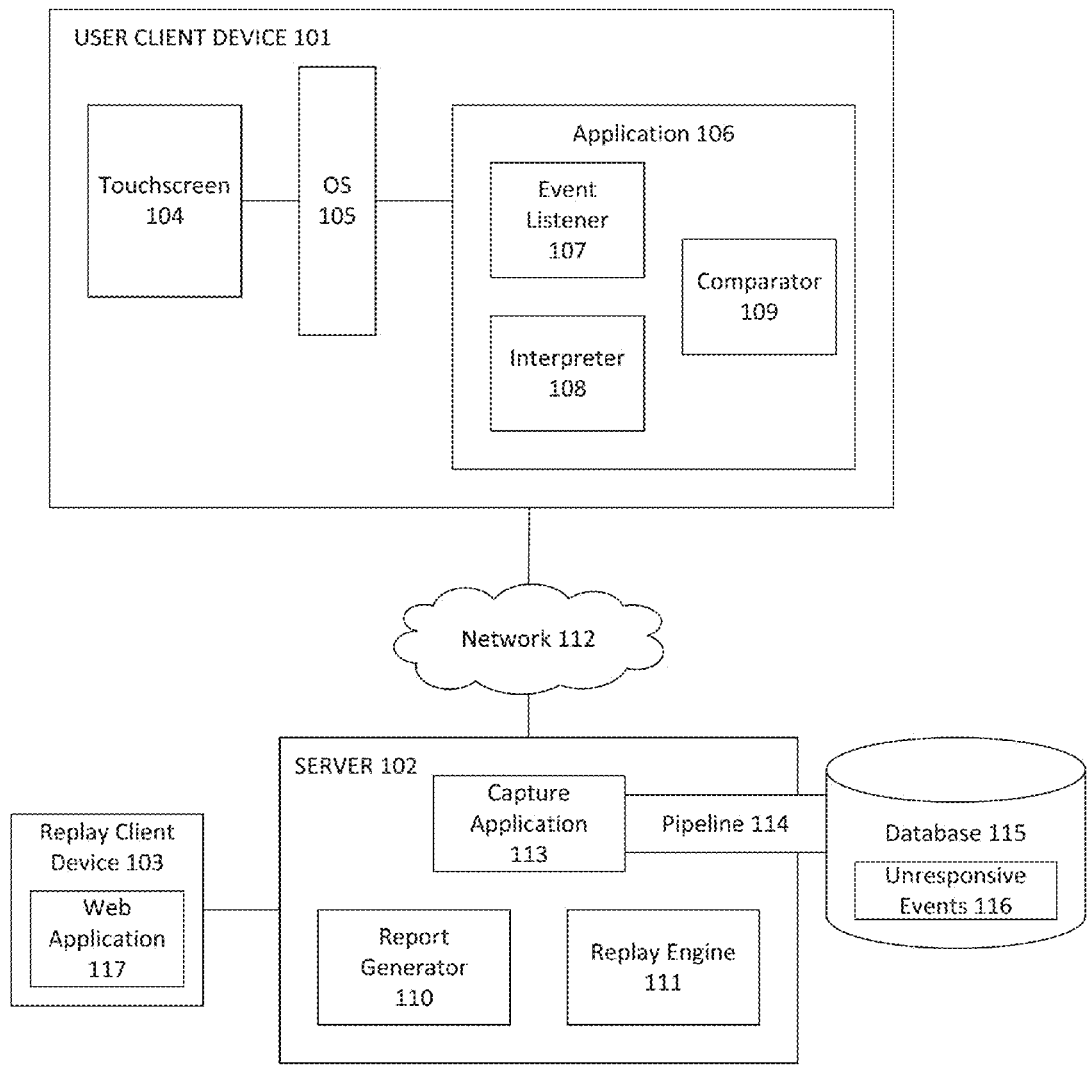
FIG. 1 illustrates a system for gesture reporting and replay according to embodiments of the present invention.

FIG. 1 illustrates a system for gesture reporting and replay according to embodiments of the present invention. The system includes a user client device 101, a server 102, and a replay client device 103. In this embodiment, the user client device 101 is a mobile device with a touchscreen 104. An operating system (OS) 105 of the user client device 101 interfaces with an application 106 and manages the application's requests for services, including outputs to the touchscreen 104 and inputs from the touchscreen 104. The application 106 renders a screen layout on the touchscreen 104, with which a user interacts through touch actions on the touchscreen 104. The screen layout may include graphical user interface (GUI) elements displayed at various locations on the touchscreen 104. The operating system 105 captures touch actions as "touch events" and passes the touch events to the application 106. The application 106 responds to the touch events according to its coded functions, such responses captured by the operating system 105 as "application events". The application 106 includes an event listener 107, an interpreter 108, and a comparator 109. The event listener 107 monitors and captures touch and application events from the operating system 105. The interpreter 108 processes the touch events captured by the event listener 107 to identify one or more gestures. The comparator 109 compares the gestures and the application events in response to the gestures against expected application events. If there is no match, then the gesture is identified to be a non-responsive gesture. Information about the gestures, the application events, and the screen layout is sent to a service hosted on a server 102. The service is provided by a capture application 113, a report generator 110, and a replay engine 111. The capture application 113 receives touch and application events captured at the user client device 101 via a network 112, and a pipeline 114 processes or parses the events to identify unresponsive events 116. The unresponsive events 116 are stored in a database 114. The replay engine 111 obtains the unresponsive events 116 and replays the corresponding gestures and application events in response to the gestures with the screen layout for the replay client device 103 via, for example, a web application 117 running in a web browser (not shown) to provide a browser based replay. The replay may alternatively be provided via a native application or a hybrid of a web and native application. The report generator 110 generates reports, including reports on any non-responsive gestures that were identified. The event listener 107, the interpreter 108, and the comparator 109 may be implemented as a computer program product, such as a software development kit (SDK) that may be provided as a library for use by the application 106.

Figure 2:
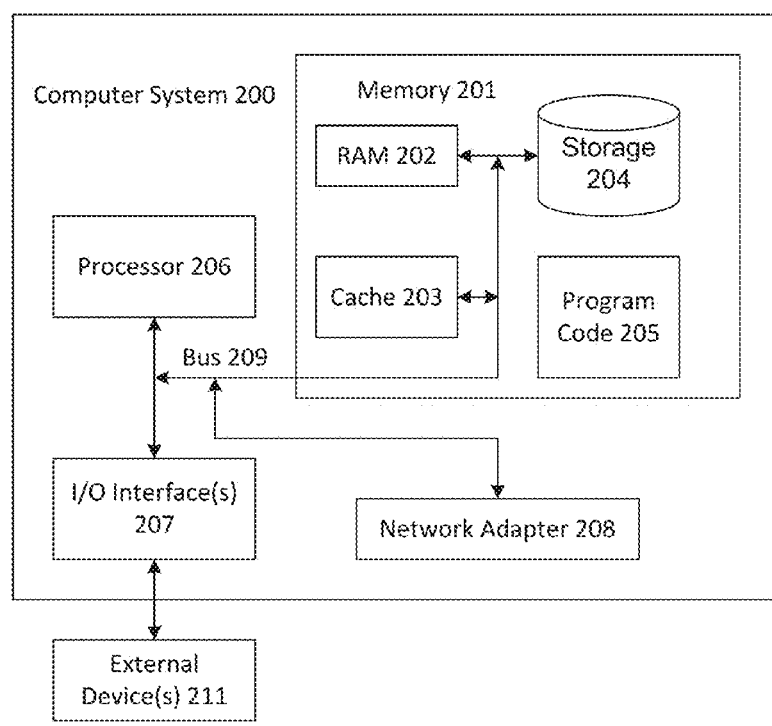
FIG. 2 illustrates a computer system according to embodiments of the present invention.

The user client device 101, the server 102, and the replay client device 103 may each comprise a computer system. FIG. 2 illustrates a computer system according to embodiments of the present invention. The computer system 200 is operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiment of the present invention when executed by the processor 206. The computer system 200 may also communicate with one or more external devices 211 via I/O interfaces 207. The computer system 200 may communicate with one or more networks via network adapter 208.

Figure 3:
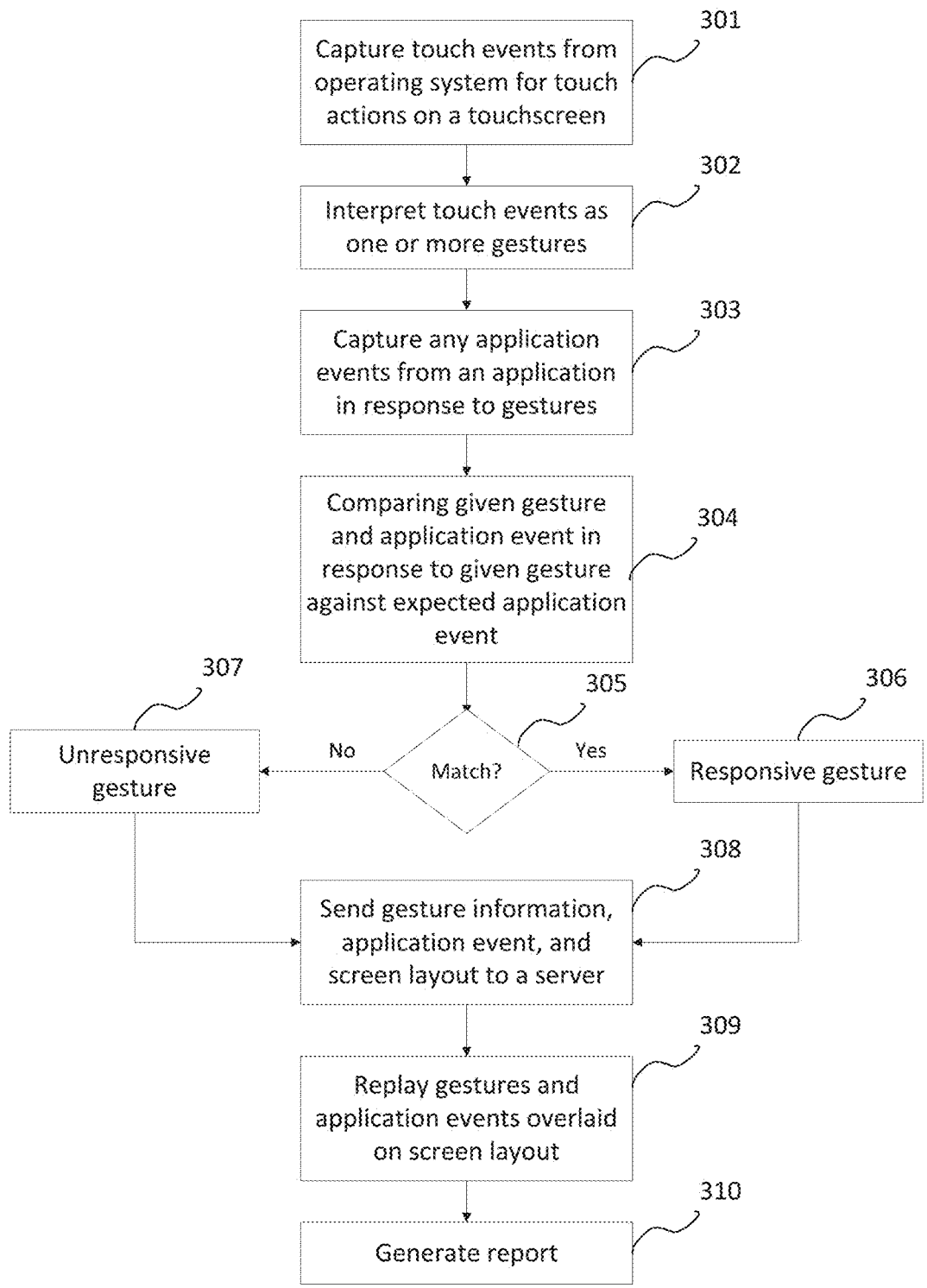
FIG. 3 illustrates a method for gesture reporting and replay according to embodiments of the present invention.

FIG. 3 illustrates a method for gesture reporting and replay according to embodiments of the present invention. Referring to both FIGS. 1 and 3, the application 106 renders a screen layout on the touchscreen 104. The user interacts with the screen layout by touching the touchscreen 104 with finger(s) or an instrument, such as a stylus. The event listener 107 captures one or more touch events from the operating system 105 for touch actions on the touchscreen 104 (301). Touch events may include a "touch start" event with the start of a touch and the coordinates on the touchscreen 104 where the touch started, a "touch end" event with the end of a touch and the coordinates on the touchscreen 104 where the touch ended, and a "touch move" event with a direction if any between the touch start and the touch end events. Other touch events may be captured based on the nature of the gesture and the level of data granularity desired. The interpreter 108 interprets the touch event(s) as one or more gestures (302). Some gestures are automatically identified by gesture recognizers provided as part of the operating system 105. Example gesture recognizers include those that capture: single or multiple taps; pinch; pan or drag; swipe; rotate; and long press. However, the gesture recognizers provided by the operating system 105 may not capture data at a level of granularity that allows the replay of the human interactions or that allows a developer to understand the intent of the user in making the gestures. To address this, the event listener 107 of the present invention gathers touch event data from the operating system 105 that are not captured by gesture recognizers provided as part of the operating system 105. For example, for a tap action followed by a hold action, a time of the hold action is additionally captured. If the time of the hold action occurs for a certain threshold amount, then the interpreter 108 interprets the gesture as a tap and hold gesture. For another example, assume there is a swipe gesture, i.e., a touch start at one location of the screen, an engagement of the touchscreen continues in a linear motion, and then a disengagement at a different location of the screen. In addition to the touch start, touch end, and touch move events, the event listener 107 captures the intermediate coordinates between the touch start and the touch and an elapsed time between the touch start and touch end. This data is used to identify the gesture and to replay the gesture, as described further below. For example, to determine whether this set of touch events is an actual swipe gesture, an analysis applying the known "line of best fit" method may be performed by the interpreter 108 using the intermediate coordinates to determine whether the path of the touch is consistent with a swipe gesture. If the path is consistent, then the touch event would be identified as a swipe gesture. For another example, if the distance between the touch start and touch end is under a threshold amount, then the touch event would not be identified as a swipe gesture and may instead be identified as a tap and hold gesture. Embodiments of the present invention may define other rules and parameters, such as those described above, to expand the definitions of the relationships between the touch events and their corresponding gestures. Additionally, action data for each individual user finger or instrument may be collected as its own dataset.

The gesture information are then passed to the relevant object that the application 106 uses to act on the gestures. The event listener 107 captures any application events for the actions by the application 106 in response to the gestures and a time elapsed between the gesture and the application event (303). The comparator 109 then compares a given gesture and the given application event in response to the given gesture against an expected application event (304). The expected application event is an expected application response corresponding to: the given gesture; the screen layout at the time of the given gesture; and an expected time lapse between the given gesture and any application event in response to the given gesture. When there is a match (305), the comparator 109 identifies the gesture as a "responsive gesture" (306). When there is no match, the comparator 109 identifies the gesture as a "non-responsive gesture" (307). In this embodiment, the comparator 109 includes a model of behavior defined based on nature of the gestures, the expected application responses corresponding to the gestures, the screen layout at the time of the gestures, and the expected time lapses between the gestures and any application events in response to the gestures. The expected application events may include events that logically follow specific gestures or that are specifically defined for the application 106. For example, when there is a pinch gesture, the expected application event may be defined in the model as a view or page change event within a certain period of time. If the comparator 109 finds that the captured application event is a view or page change event and the time elapsed between the pinch gesture and the view or page change event is within the certain period of time, then the comparator 109 identifies the pinch gesture as a responsive gesture. In contrast, if the comparator 109 finds that there was no view or page change event within the certain period of time, then the comparator 109 identifies the pinch gesture as a non-responsive gesture. For another example, when there is a tap gesture, the expected application event may be defined in the model as a button click event within a certain period of time. If the comparator 109 does not find a button click event within the certain period of time, then the comparator 109 identifies the tap gesture as a non-responsive gesture. For another example, when there is a swipe gesture in the up and down direction, the expected application event may be defined in the model as a scroll event within a certain period of time. If the comparator 109 does not find a scroll event within the certain period of time, then the comparator 109 identifies the swipe gesture as a non-responsive gesture. Optionally, when a non-responsive gesture is identified, an alert may also be displayed, while the user is interacting with the touchscreen 104, to prompt for information concerning the user's intent.

Gesture information for the given gesture, any application events in response to the given gesture, and the screen layout displayed on the touchscreen 104 at the time of the given gesture are then sent to the server 102 (308). The screen layout may include the graphical user interface (GUI) elements displayed and their coordinates at the time of the corresponding touch action. The gesture information may include the touch events for the gesture and whether they were identified as responsive or non-responsive gestures. The replay engine 111 of the server 102 matches each gesture with its corresponding application event (if any) and the screen layout displayed during the gesture. The replay engine 11 then replays the gestures and the application events on the screen layout for a replay client device 103 via the web application 117 (309). In this way, the replay engine 111 graphically mimics the human interactions and the application response (or lack thereof), along with the view or page and its GUI elements that were displayed at the time of the responsive and/or non-responsive gestures.

The report generator 110 of the server 102 may generate reports comprising information for the responsive and/or non-responsive gestures (310). The reports may include the gesture information for one or more gestures, including their corresponding touch events, and any application events in response to the gestures. The reports may further include the screen layout, identifying the views or pages and their GUI elements that were displayed at the time of the gestures. The reports may include such information for a plurality of responsive and/or non-responsive gestures, over a single or multiple application sessions and for a single or multiple user client devices 101. The reports may also include specifics concerning application sessions and the user client devices to which the responsive and/or non-responsive gestures apply. By identifying trends and patterns from such information, the developer can not only identify problems with the application code or GUI design, but also identify design issues or complexities. For example, the reports may include the results of an analysis that indicate that a particular button is associated with non-responsive gestures primarily on devices with smaller screen sizes, thus indicating that the size of the button may potentially be too small. For another example, the reports may include the results of an analysis that indicate a pattern of non-responsive tap gestures on a particular GUI element, thus indicating that users may erroneously be interpreting this GUI element as a button. For another example, the reports may include the results of an analysis that indicate that a disproportionate number of non-responsive gestures are occurring on a particular screen view or page. The results provided in the reports may incorporate information captured over a certain period of time.

Figure 4:
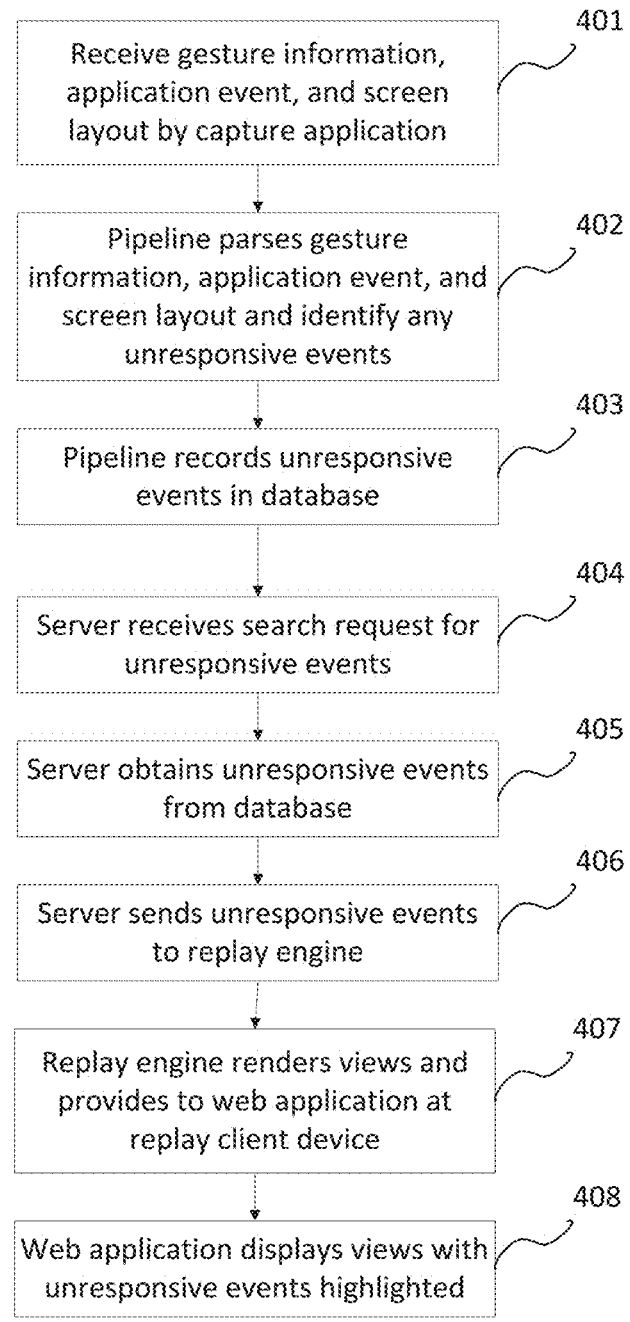
FIG. 4 illustrates in more detail a method for gesture replay of unresponsive gestures according to embodiments of the present invention.

FIG. 4 illustrates in more detail a method for gesture replay of unresponsive gestures according to embodiments of the present invention. Referring to both FIGS. 1 and 4, the capture application 113 receives the gesture information, application event, and screen layout sent to it by the user client device 101 via a network 112 (401). The pipeline 114 parses this data and stores the data in the database 115. The pipeline 114 also identifies any unresponsive events 116 (402) (for unresponsive gestures identified by the interpreter 108) and records the unresponsive events 116 in the database 115 (403). At some point later, the server 102 receives a search request for unresponsive events (404) and obtains the unresponsive events 116 from the database 115 (405). The server 102 sends the unresponsive events 116 to the replay engine 111 (406). The replay engine 111 renders one or more views, using for example HyperText Markup Language (HTML), where the replay engine 111 matches each gesture with its corresponding application event (if any) and the screen layout displayed during the gesture. The replay engine 111 provides the views to the web application 117 at the replay client device 103 (407). The web application 117 displays the views with the unresponsive events highlighted in some fashion (408). The replay allows the application developer to view the gesture and the application response (or lack thereof) as seen by the user, providing the developer data to identify application code or GUI design problems.

Figure 5A:
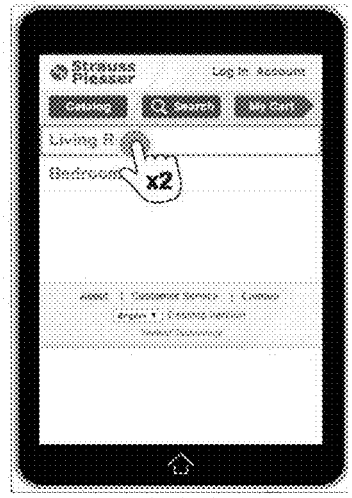
FIGS. 5A-5D illustrates example screenshots from animated replays provided by the replay engine according to embodiments of the present invention.
Figure 5B:
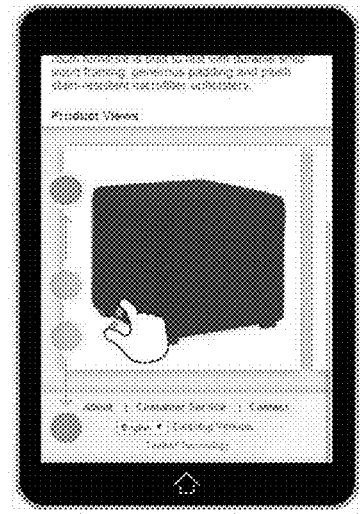
Figure 5C:
Figure 5D:

Although the above description focuses on the replay of unresponsive events, in one embodiment, both responsive and unresponsive events identified by the interpreter 108 are sent to the server 102, stored in the database 115, and rendered in the views for replay. FIGS. 5A-5D illustrate example screenshots from animated replays of responsive gestures provided by the replay engine according to embodiments of the present invention. FIG. 5A illustrates a screen shot of an example replay of a double tap gesture, which replays a tap gesture in one location twice within a certain period of time. FIG. 5B illustrates a screen shot of an example replay of a zoom gesture, which replays two simultaneous taps and holds that were captured with a move toward one another before release. FIG. 5C illustrates a screen shot of an example replay of a tap gesture, which replays a single touch in one location with a release within a certain period of time. FIG. 5D illustrates a screen shot of an example replay of a swipe gesture, which replays a touch start at in one location of the screen, a move in any linear motion to a different location of the screen, and a release or touch end at the different location. The intermediate coordinates captured as described above are used to replay the actual path of the move to the different location, and the elapsed time between the touch start and touch end is used to replay the speed of the swipe gesture. FIGS. 6A-6F illustrate example graphics that may be used by the replay engine 111 in replaying unresponsive gestures according to embodiments of the present invention. The graphics for unresponsive and responsive gestures may differ in color, icon, size, etc.

Figure 7:
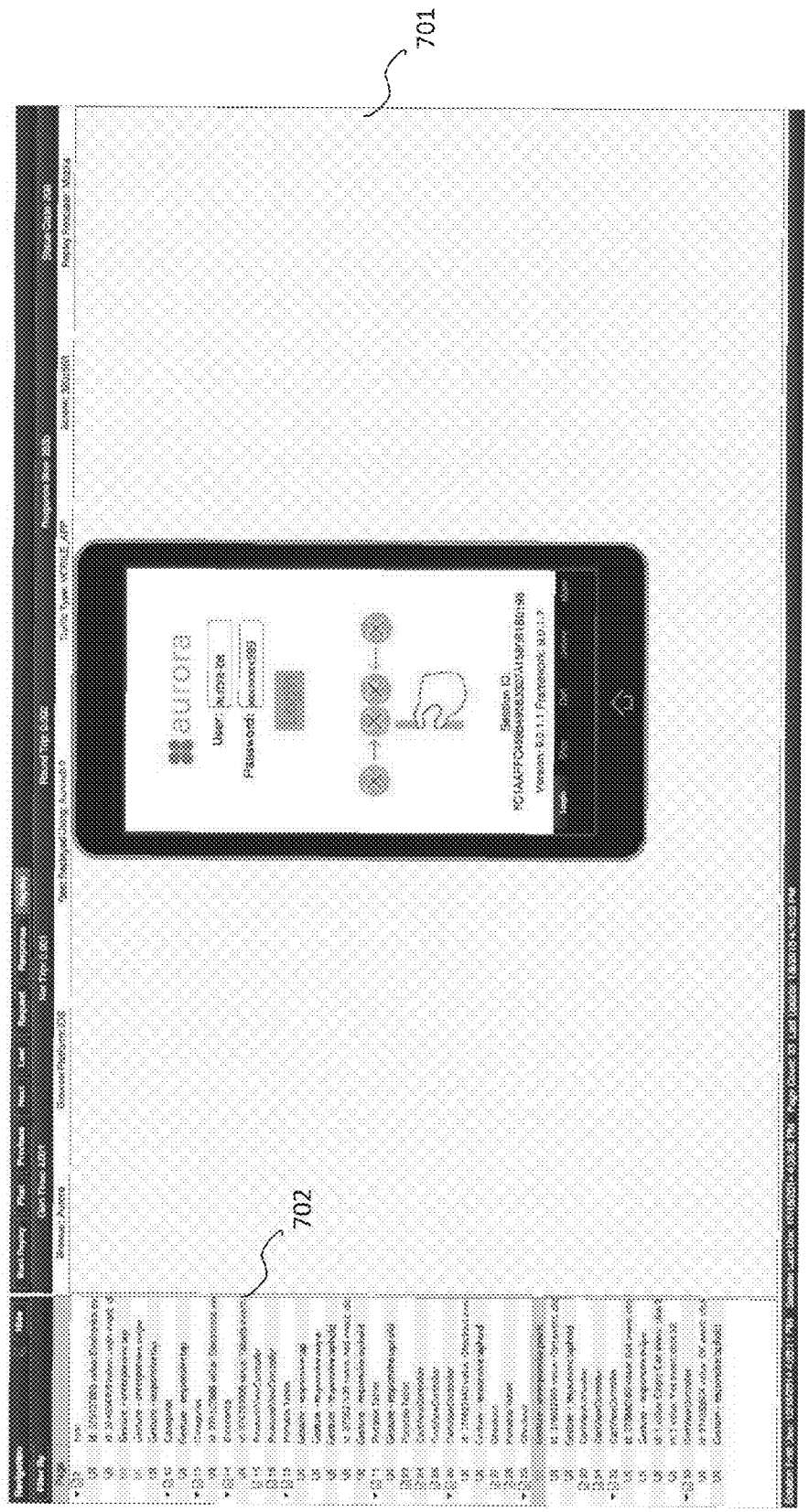
FIG. 7 illustrates an example replay interface provided by the web application according to embodiments of the present invention.
Figure 8:
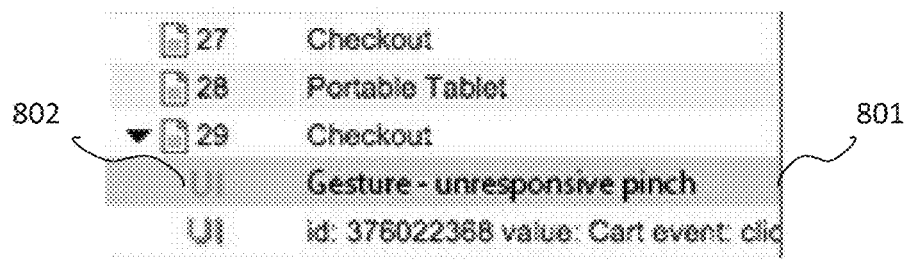
FIG. 8 illustrates an example close-up of a listing of an unresponsive event in the navigation window according to embodiments of the present invention.

FIG. 7 illustrates an example replay interface according to embodiments of the present invention. The replay interface displays the views provided by the replay engine 111 in a replay window 701. The replay interface further displays a navigation window 702, where the events may be listed. A user may select a particular event to view the replay of that event. FIG. 8 illustrates an example close-up of a listing of an unresponsive event in the navigation window according to embodiments of the present invention. The listing may include the name 801 of the unresponsive gesture, which may be highlighted 802 in some fashion, such as by a particular color or icon.

Other gesture types and replays may include one or more of the following:

Triple tap: one finger tap in one location three times in close succession (within X seconds)

Tap and hold: one finger tap in one location without raising finger for X seconds Two-finger tap: two finger tap in each finger in one location once Two-finger double tap: two finger tap each finger in one location twice in close succession (within X seconds)

Swipe vertically: one finger start in one area of screen and continues to engage screen and move finger vertically (up or down) direction and removes finger in different location directly above or below initial screen engagement location.

Swipe horizontal: one finger start in one area of screen and continues to engage screen and move finger horizontally (left or right) direction and removes finger in different location directly left or right initial screen engagement location.

Swipe up: one finger start in one area of screen and continues to engage screen and move finger vertically towards current top orientation of screen and removes finger in different location directly above (relative to screen orientation) initial screen engagement location.

Swipe down: one finger start in one area of screen and continues to engage screen and move finger vertically towards current bottom orientation of screen and removes finger in different location directly below (relative to screen orientation) initial screen engagement location.

Swipe left: one finger start in one area of screen and continues to engage screen and move finger horizontally left based on current orientation of screen and removes finger in different location directly left (relative to screen orientation) initial screen engagement location.

Swipe right: one finger start in one area of screen and continues to engage screen and move finger horizontally right based on current orientation of screen and removes finger in different location directly right (relative to screen orientation) initial screen engagement location.

Drag (any direction): one finger tap and hold and move in any direction to a different screen location for release.

Drag vertically: one finger tap and hold and move vertically to a different screen location for release directly above or below initial screen engagement as relative to current device orientation Drag horizontally: one finger tap and hold and move horizontally to a different screen location for release directly left or right initial screen engagement as relative to current device orientation.

Drag up: one finger tap and hold and move vertically up to a different screen location for release directly above initial screen engagement as relative to current device orientation.

Drag down: one finger tap and hold and move vertically down to a different screen location for release directly below initial screen engagement as relative to current device orientation.

Drag left: one finger tap and hold and move horizontally left to a different screen location for release directly left of initial screen engagement as relative to current device orientation.

Drag right: one finger tap and hold and move horizontally right to a different screen location for release directly right of initial screen engagement as relative to current device orientation.

Two-finger swipe vertically: two finger start in one area of screen and continue to engage screen and move fingers vertically (up or down) direction and removes fingers in different location directly above or below initial screen engagement location.

Two finger swipe horizontal: two fingers start in one area of screen and continues to engage screen and move fingers horizontally (left or right) direction and removes fingers in different location directly left or right initial screen engagement location.

Two finger swipe up: two fingers start in one area of screen and continues to engage screen and move fingers vertically towards current top orientation of screen and removes fingers in different location directly above (relative to screen orientation) initial screen engagement location.

Two finger swipe down: two fingers start in one area of screen and continues to engage screen and move fingers vertically towards current bottom orientation of screen and removes fingers in different location directly below (relative to screen orientation) initial screen engagement location.

Two finger swipe left: two fingers start in one area of screen and continues to engage screen and move fingers horizontally left based on current orientation of screen and removes fingers in different location directly left (relative to screen orientation) initial screen engagement location.

Two finger swipe right: two fingers start in one area of screen and continues to engage screen and move fingers horizontally right based on current orientation of screen and removes fingers in different location directly right (relative to screen orientation) initial screen engagement location.

Spread: two finger tap and hold and move away from one another in any direction for release.

Rotate left: two finger tap and hold and move counter clock wise in circular motion.

Rotate right: two finger tap and hold and move clock wise in circular motion.

Any number of fingers or complex gesture behavior may also be captured and replayed. Although the above gestures are described with the use of a "finger", other instruments may be used to perform the gestures as well.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, the computer program product comprising a computer readable storage medium having program instructions embodied therewith, the program instructions executable by a processor to cause the processor to perform a method comprising:
   capturing one or more touch events from an operating system of a client device for touch actions that occur on a touchscreen coupled to the client device;
   interpreting the one or more touch events as a gesture;
   capturing an application event from an application, where the captured application event occurs in response to the gesture;
   determining, in response to interpreting the one or more touch events as the gesture, an expected application event corresponding to the gesture;
   comparing the captured application event against the expected application event;
   when the captured application event matches the expected application event, identifying the gesture as a responsive gesture; and
   when the captured application event does not match the expected application event, identifying the gesture as a non-responsive gesture.

2. The computer program product of claim 1, further comprising:
   receiving data from the client device, where the data comprises gesture information for the gesture, the captured application event, and a screen layout displayed on the touchscreen at the time of the gesture;
   parsing the data to identify one or more unresponsive events for the non-responsive gesture; and
   storing the one or more unresponsive events.

3. The computer program product of claim 2, further comprising:
   receiving a search request for unresponsive events;
   in response to the search request, obtaining the one or more unresponsive events;
   sending the one or more unresponsive events to a replay engine; and
   rendering, by the replay engine, one or more views comprising the gesture, the captured application event, and the screen layout for the one or more unresponsive events, wherein the one or more views are replayed by a replay client device.

4. The computer program product of claim 3, further comprising:
   receiving the one or more views at the replay client device; and
   displaying the one or more views with the one or more unresponsive events highlighted.

5. The computer program product of claim 2, further comprising:
   generating a report using the gesture information for the gesture, the captured application event in response to the gesture, and the screen layout displayed on the touchscreen at the time of the gesture.

6. The computer program product of claim 5, further comprising: generating the report for a plurality of application sessions across a plurality of client devices.

7. The computer program product of claim 1, wherein the determining of the expected application event comprises obtaining expected application event information, where the expected application event information comprises an intended application response corresponding to the gesture, the screen layout at the time of the gesture, and an expected time lapse between the gesture and the captured application event in response to the gesture.

8. The computer program product of claim 1, wherein the expected application event is selected from a group consisting of an application event that logically follows the gesture and an application event specifically defined for the application.

9. The computer program product of claim 1, wherein the gesture interpreted from the one or more touch events is one gesture of a plurality of gestures, and the method comprises:
   interpreting the plurality of gestures from the one or more touch events,
      wherein the captured application event that occurs in response to the one gesture is also in response the other gestures of the plurality of gestures,
      wherein the expected application event that is determined in response to interpreting the one or more touch events as the one gesture is also determined in response to interpreting the one or more touch events as the other gestures of the plurality of gestures, so that the expected application event corresponds to the plurality of gestures;
   identifying the plurality of gestures as a plurality of responsive gestures when the captured application event matches the expected application event; and
   identifying the plurality of gestures as a plurality of non-responsive gestures when the captured application event does not match the expected application event.

10. A system, comprising:
    a processor; and
    a computer readable storage medium having program instructions embodied therewith, the program instructions executable by a processor to cause the processor to perform a method comprising:
       capturing one or more touch events from an operating system of a client device for touch actions that occur on the touchscreen;
       interpreting the one or more touch events as a gesture;
       capturing an application event from an application, where the application event occurs in response to the gesture;
       determining, in response to interpreting the one or more touch events as the gesture, an expected application event corresponding to the gesture;
       comparing the captured application event against the expected application event;
       when the captured application event matches the expected application event, identifying the gesture as a responsive gesture; and
       when the captured application event does not match the expected application event, identifying the gesture as a non-responsive gesture.

11. The system of claim 10, wherein the method further comprises:
    receiving data from the client device, where the data comprises gesture information for the gesture, the captured application event, and a screen layout displayed on the touchscreen at the time of the gesture;
    parsing the data to identify one or more unresponsive events for a non-responsive gesture; and
    storing the one or more unresponsive events.

12. The system of claim 11, wherein the method further comprises:
generating a report using the gesture information for the gesture, the captured application event, and the screen layout displayed on the touchscreen at the time of the gesture.

13. The system of claim 10, wherein the method further comprises:
receiving a search request for unresponsive events;
in response to the search request, obtaining the one or more unresponsive events;
sending the one or more unresponsive events to a replay engine; and
rendering, by the replay engine, one or more views comprising the gesture, the captured application event, and the screen layout for the one or more unresponsive events, wherein the one or more views are replayed by a replay client device.

14. The system of claim 13, wherein the method further comprises:
receiving the one or more views at the replay client device; and
displaying the one or more views with the one or more unresponsive events highlighted.

15. The system of claim 10, wherein the determining of the expected application event comprises obtaining expected application event information, where the expected application event information comprises an intended application response corresponding to the gesture, the screen layout at the time of the gesture, and an expected time lapse between the gesture and the captured application event in response to the gesture.

16. The system of claim 10, wherein the expected application event is selected from a group consisting of an application event that logically follows the gesture and an application event specifically defined for the application.

17. The system of claim 10, wherein the gesture interpreted from the one or more touch events is one gesture of a plurality of gestures, and the method comprises:
interpreting the plurality of gestures from the one or more touch events,
wherein the captured application event that occurs in response to the one gesture is also in response the other gestures of the plurality of gestures,
wherein the expected application event that is determined in response to interpreting the one or more touch events as the one gesture is also determined in response to interpreting the one or more touch events as the other gestures of the plurality of gestures, so that the expected application event corresponds to the plurality of gestures;
identifying the plurality of gestures as a plurality of responsive gestures when the captured application event matches the expected application event; and
identifying the plurality of gestures as a plurality of non-responsive gestures when the captured application event does not match the expected application event.

18. A computer program product, the computer program product comprising a computer readable storage medium having program instructions embodied therewith, the program instructions executable by a processor to cause the processor to perform a method comprising:
receiving data from a client device, where the data comprises gesture information for a gesture, a captured application event that occurred in response to the gesture, and a screen layout displayed on a touchscreen at the time of the gesture;
parsing the data to identify one or more unresponsive events for a non-responsive gesture, wherein the non-responsive gesture is identified by:
capturing one or more touch events from an operating system of the client device for touch actions that occur on the touchscreen coupled to the client device;
interpreting the one or more touch events as the gesture;
capturing the application event from an application, where the captured application event occurs in response to the gesture;
determining, in response to interpreting the one or more touch events as the gesture, an expected application event corresponding to the gesture;
comparing the captured application event against an expected application event;
when the captured application event matches the expected application event, identifying the gesture as a responsive gesture; and
when the captured application event does not match the expected application event, identifying the gesture as the non-responsive gesture;
storing the one or more unresponsive events for the non-responsive gesture;
receiving a search request for unresponsive events;
in response to the search request, obtaining the one or more unresponsive events;
sending the one or more unresponsive events to a replay engine; and
rendering, by the replay engine, one or more views comprising the gesture, the captured application event, and the screen layout displayed on the touchscreen at the time of the gesture for the one or more unresponsive events, wherein the one or more views are replayed by a replay client device.

19. The computer program product of claim 18, wherein the gesture interpreted from the one or more touch events is one gesture of a plurality of gestures, and the method comprises:
interpreting the plurality of gestures from the one or more touch events,
wherein the captured application event that occurs in response to the one gesture is also in response the other gestures of the plurality of gestures,
wherein the expected application event that is determined in response to interpreting the one or more touch events as the one gesture is also determined in response to interpreting the one or more touch events as the other gestures of the plurality of gestures, so that the expected application event corresponds to the plurality of gestures;
identifying the plurality of gestures as a plurality of responsive gestures when the captured application event matches the expected application event; and
identifying the plurality of gestures as a plurality of non-responsive gestures when the captured application event does not match the expected application event.

\* \* \* \* \*